SPRING CONTACTOR

Filed March 12, 1954

INVENTOR.
JOSEPH T. CATALDO,
KURT KADELBURG
BY
I. Gordon Angus
ATTORNEY.

United States Patent Office 2,780,667

Patented Feb. 5, 1957

2,780,667

SPRING CONTACTOR

Joseph T. Cataldo, Los Angeles, and Kurt Kadelburg, West Los Angeles, Calif., assignors to International Rectifier Corporation, El Segundo, Calif., a corporation of California Application March 12, 1954, Serial No. 415,804

6 Claims. (Cl. 174—126)

This invention relates to a current collecting spring contact washer for a dry plate rectifier.

A dry plate rectifier element commonly comprises a metal base plate which is coated on one side with a semi-conductor such as selenium. The semi-conductor is then coated with a layer of some suitable conducting metal to form a counter electrode, and then, by an electroforming process well known in the art, a barrier layer is formed between the semi-conductor and the counter electrode.

It is necessary to provide means for collecting current from the counter electrode when the rectifier element is used as a part of an electrical circuit. Conical spring contact washers pressed against the counter electrode are frequently used for this purpose, but such conventional contact washers have serious limitations. For example, the undesirable current flow in the "reverse" direction increases as the pressure of the washer on the counter electrode is raised, thereby reducing the value of the rectifying element. Previously known washers have had a tendency to exert an undesirably high pressure on the counter electrode because of a lack of pressure-reducing elements in the washer itself.

In addition, conventional contact washers usually have made only a thin line contact with the counter electrode. The resistance to forward flow from the thin counter electrode into the spring contact washer through such a small contact area is apt to be undesirably high.

Accordingly, it is an object of this invention to provide a spring contact washer which makes contact with the counter electrode so as to permit less reverse flow and present less resistance to forward flow than results when conventional spring washers are used.

The invention is carried out by providing a flexible disc of conducting metal with unique means for establishing contact with the counter electrode of a flat rectifier element. A feature of the invention resides in an outer contact ring at the periphery of the disc contacting the counter electrode, an inner contact ring adapted to be pressed flat against the rectifier element to make a surface contact therewith, a flexible bead section between and joining the two rings, and a bellows section at the center of the disc.

The above and other features of the invention will be fully understood from the following detailed description and the accompanying drawings, of which:

Figure 2:
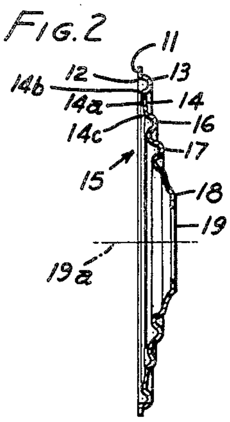
Fig. 2 is a cross-section taken at line 2—2 of Fig. 1.
Figure 1:
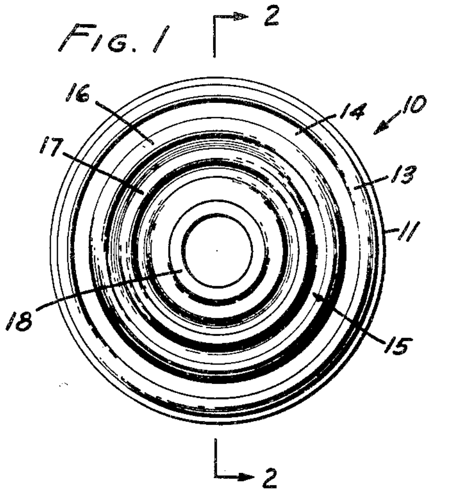
Fig. 1 is a plan view of a spring contact washer according to the invention.

Referring to Figs. 1 and 2, there is shown a spring contact washer 10 in its unflexed condition comprising a flexible circular metal disc of a suitable conducting metal, brass for example. The left side of the washer as shown in Fig. 2 is the contact side which is to be pressed against a rectifier element. This washer has an outer contact ring 11 next to the periphery of the disc, having a pointed sharp edge 12 at its inner margin, rather than a curve. This edge 12 is formed by the intersection of the outer ring and a flexible bead 13. The bead is preferably a hump which is substantially a half-circle in cross-section and serves to join the outer contact ring 11 to an inner contact ring 14.

In diametrical cross-section, the inner ring 14 has a contact surface 14*a* which is a straight line between intersection 14*b* of the flexible bead and inner ring, and intersection 14*c* of the inner ring and an undulating bellows section 15. This bellows section comprises reverse curves 16, 17, and a land 18 with a central hole therein and is formed inside the inner contact ring 14, the reverse curves lying between the land and the inner contact ring. The disc has a central axis 19*a*, and the inner ring 14 is spaced from the outer ring along this axis so that the rings are disposed step-wise from the periphery of the disc. The bellows section 15, and the land 19, are also axially spaced from the outer ring on the same side as the inner ring, and preferably are farther away from the outer ring than from the inner ring along the axis 19*a*.

Figure 3:
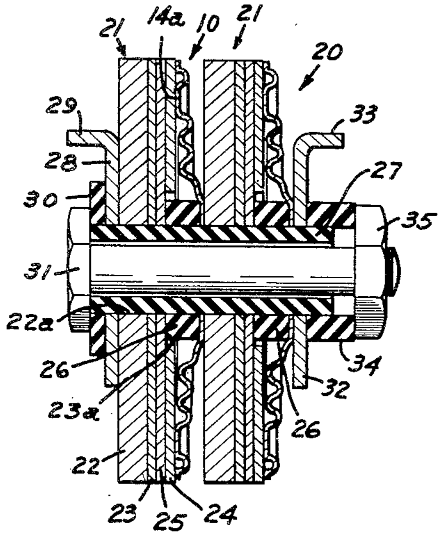
Fig. 3 is a view, partly in cross-section, of a dry plate rectifier stack incorporating the washer of Fig. 1.

Fig. 3 shows the washer of Figs. 1 and 2 installed compressed in a dry pate rectifier stack 20. Such rectifier stacks commonly have a plurality of rectifier elements 21, and while only two of these elements are shown in Fig. 3, it will be appreciated that more or fewer could be used. Each of these elements has a metal base plate 22, with a central hole 22*a*. These plates are often made of aluminum, iron, and other metals and are coated on one side with a semi-conductor 23 such as selenium. The surface of this semi-conductor is then sprayed, except for an annulus 23*a* at the center, with a layer 24 of a suitable conductive metal, which may be Wood's metal, to form a counter electrode. A barrier layer 25 is created between the counter electrode and the semi-conductor by an electroforming process well-known in the art. These layers 23, 24, 25 are shown disproportionately thick with respect to the base plate for purposes of illustration. A spacer 26 of insulating material abuts against the center of the rectifier element at the annulus 23*a*. Current collecting means, in this case the spring washer 10, are then placed against the counter electrode.

A cylinder 27 of insulating material is then inserted through holes 22*a* and 19 in the plates and contact washers, respectively, and through the spacers 26. A terminal washer 28 with a lug 29 is placed against the left hand base plate as shown in Fig. 3. An insulating washer 30 next to the head of a bolt 31 bears against the terminal washer when the bolt is inserted in cylinder 27.

At the right hand end of the stack, a terminal washer 32 with a lug 33 presses against a spring contact washer. An insulating washer 34 is placed between this terminal washer and a nut 35 on the end of the bolt. The tightening of this nut compresses the entire assembly and holds it together.

Figure 4:
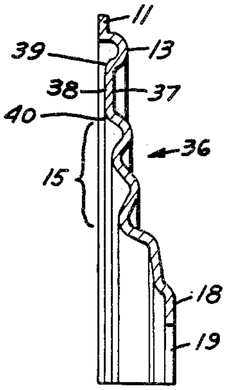
Fig. 4 is a partial cross-sectional view of another washer according to the invention.

Fig. 4 shows another form of spring contact washer 36 according to the invention, which has all the features of washer 10, and it may be used alternatively to that of Figs. 1 and 2. However, it differs from that of Figs. 1 and 2 in that its inner contact ring 37, which corresponds to ring 14 of washer 10, has a contact surface 38 which is a flat annulus rather than the frustum of a cone when the washer is unflexed. In diametrical cross-section, the surface 38 is a straight line between the intersection 39 of the inner ring and the flexible bead, and the intersection 40 of the inner ring and the bellows section. This washer 36 may be installed in the rectifier stack of Fig. 3 in place of washer 10, and when the stack is compressed on assembly, washer 36 will have the same appearance in diametrical cross-section as washer 10.

When the rectifier stack is assembled, the nut 35 is tightened on the bolt, and the land 18 of each spring contact washer 10 is pressed toward the adjacent spacer 26. The outer contact ring 11 first touches the counter electrode, and makes a surface contact therewith. As the nut is further tightened, the bead 13 flexes, and the inner contact ring 14 moves into contact with the counter electrode. This inner contact ring is sufficiently flexible that, even though frusto-conical in its unflexed condition, it will be deformed and lie flat against the counter electrode to make a surface contact with it when compressed.

After the inner contact ring is pressed to the counter electrode, further flexing of the spring contact washer is largely confined to the bellows section. Therefore neither the inner nor the outer contact ring will then be pried off the counter electrode by further compression of the stack. The spacer 26 limits the maximum compressive force which can be exerted on the counter electrode by the spring contact washer, for when the land is pressed tightly against the spacer, and the spacer pressed tightly against the base plate, any increased force is exerted directly on the spacer, which is not very elastic, rather than on the more flexible contact washer. Thus there will be no appreciable additional flexure of the contact washer itself. Pressure of the spacer on the annulus 23*a* does not affect the rectifiying properties of the element.

When assembled and connected into a circuit, current can flow in a "forward" direction from lug 29 to base plate 22 and through the semi-conductor, barrier layer and counter electrode in that order, to the spring contact washer. It enters the washer at inner ring 14, and also through the outer ring 11. Current flows through the contact washer to the land 18 which bears against a neighboring base plate. The flow through the next and any other successive rectifier elements is similar, until it emerges from the last contact washer into terminal washer 32 and lug 33.

The washer of Fig. 4 is installed in the same manner as that of Figs. 1 and 2 and in place thereof, compression by the nut causing the bead to flex so that the flat inner contact ring moves toward the rectifier element to make a flat surface contact therewith. The ring 37, being originally flat, will not have to be deformed to make a surface contact. The current flow through the stack will be the same as described above, and the appearance of the contact washer 36 when installed will be as shown in Fig. 3.

The spacer dimensions in this stack are not as critical as are similar dimensions in rectifier stacks utilizing contact washers which make a line contact with the rectifier elements. With the use of washer 10 or 36, a good surface contact will be made even if the spacer is somewhat too long, since the bellows are intended to be slightly compressed. In addition, it will be appreciated that the provision of the bellows results in a more flexible washer so that in the event the spacer is somewhat too short, the flexing of the bellows will relieve the counter electrode of excessive pressures.

It will also be appreciated that all parts of the spring contact washer flex simultaneously until the spacer is firmly compressed between the land and the rectifier element. However, since the contact rings are axially spaced from each other, the outer ring makes the initial contact, and then the bead and inner ring do most of the flexing until the inner ring has made its full surface contact. After that, the flexing is substantially confined to the bellows section.

The spring contact washer according to this invention offers many advantages over previously known contact washers. These previous contact washers have ordinarily been generally conical in shape, and have made only a line contact with the counter electrode. For a given compressive force on the washer, this line contact exerts a higher pressure on the counter electrode than does the surface contact of the washer of this invention, since the force is distributed over a smaller area. By providing a lower pressure, this novel washer reduces the "reverse" current through the rectifier.

The bellows section also contributes to the reduction of pressure on the counter electrode by its tendency to flex at lower compressive forces that a simple frusto-conical disc. This keeps the force on the counter electrode to a lower value for a given axial flexure of the contact washer.

The surface contact has a further advantage over a line contact, inasmuch as it makes contact over a larger area. This reduces the electrical resistance at the junction of the washer and counter electrode, and increases the efficiency of the rectifier itself. A reduction in resistance is important, since the current density in the thin layers is quite high.

Also, in dry plate rectifiers, it is customary to coat the rectifier elements with varnish after the rectifier is assembled to protect them from moisture. This varnish tends to creep, by capillary action, between the outer contact ring and the rectifier element. This seepage reduces the area of contact with the counter electrode, and thereby increases the resistance of the rectifier. By use of the present invention, the flexible bead in the contact washer provides an expanded channel between the washer and the counter electrode which breaks the capillary movement of the varnish. Therefore the varnish never reaches the inner ring's contact surface 14*a*, which is the contact surface primarily relied on for transmitting the current.

In previously known spring contact washers, varnish has crept under the contact points and dried to form a meniscus which tended to pry the washer off the surface of the counter electrode when the compressive forces on the washer varied due to thermal expansion and contraction. In this invention, the provision of the sharp edge 12 reduces the effectiveness of such a meniscus as a fulcrum, since the bead breaks sharply away from the counter electrode, and does not act as an effective lever arm to lift the outer ring. It will be appreciated that the effectiveness of the bead section in stopping capillary action does not depend on the sharp edge 12, and that this edge may be rounded if desired.

Accordingly, by this unique contact washer, there is provided a contact means which at once reduces the unit pressure on the counter electrode and increases the area of contact, thus reducing both the "reverse" flow and resistance to "forward" flow. The bellows section provides a means for reducing the pressure exerted on the counter electrode for a given axial movement of the land.

This invention is not to be limited to the embodiments shown in the drawings and described in the description, which are given by way of example and not of limitation, but only in accordance with the scope of the appended claims.

I claim:

1. A current collecting spring contact washer for a dry plate rectifier comprising a flexible disc having a central axis, an undulating bellows section surrounding the central axis, said undulating bellows section having at least two convex undulations on each side of the washer, an inner contact ring surrounding and contiguous with the bellows section, a flexible bead surrounding and contiguous with the inner contact ring, and an outer contact ring surrounding and contiguous with the flexible bead, the bellows section, inner and outer contact rings and the flexible bead being concentric around the central axis, the inner ring being axially spaced from the outer ring, whereby increasing compression of the spring contact washer against a flat surface first causes the outer contact ring to make contact with said flat surface, then the inner contact ring to make a surface contact with the flat surface, and then the bellows section to flex, the bead stopping any capillary action tending to cause varnish applied to the rectifier to creep to the inner contact ring, and the bellows flexing to prevent the prying of the inner contact ring from the flat surface.

2. A current collecting spring contact washer according to claim 1 in which the inner contact ring has a contact surface which, in diametrical cross-section, is a straight line between the junction of the inner ring and the flexible bead and the junction of the inner ring and the bellows section.

3. A current collecting spring contact washer according to claim 1 in which the inner contact ring is frusto-conical when the washer is in its unflexed condition.

4. A current collecting spring contact washer according to claim 1, in which the inner contact ring is a flat annulus when the washer is in its unflexed condition.

5. A current collecting spring contact washer according to claim 3 in which the outer contact ring and the flexible bead intersect to form a sharp pointed edge.

6. A current collecting spring contact washer according to claim 4 in which the outer contact ring and the flexible bead intersect to form a sharp pointed edge.

References Cited in the file of this patent

UNITED STATES PATENTS 2,656,495 Smith ------------------ Oct. 20, 1953

FOREIGN PATENTS 555,615 Great Britain ---------- Aug. 31, 1943